US012612328B2

(12) United States Patent
Arai

(10) Patent No.: US 12,612,328 B2
(45) Date of Patent: Apr. 28, 2026

(54) GLASS FOR MEDICINE CONTAINER, AND GLASS TUBE FOR MEDICINE CONTAINER AND MEDICINE CONTAINER USING SAME

(71) Applicant: Nippon Electric Glass Co., Ltd., Shiga (JP)

(72) Inventor: Satoshi Arai, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 380 days.

(21) Appl. No.: 17/419,879

(22) PCT Filed: Jan. 20, 2020

(86) PCT No.: PCT/JP2020/001704
§ 371 (c)(1),
(2) Date: Jun. 30, 2021

(87) PCT Pub. No.: WO2020/153294
PCT Pub. Date: Jul. 30, 2020

(65) Prior Publication Data
US 2022/0048808 A1      Feb. 17, 2022

(30) Foreign Application Priority Data

Jan. 23, 2019      (JP) ................................. 2019-009119
Aug. 13, 2019      (JP) ................................. 2019-148449

(51) Int. Cl.
| | |
|---|---|
| *C03C 3/093* | (2006.01) |
| *A61J 1/06* | (2006.01) |
| *A61J 1/14* | (2023.01) |
| *C03C 3/087* | (2006.01) |
| *C03C 4/20* | (2006.01) |

(52) U.S. Cl.
CPC ................. *C03C 3/093* (2013.01); *A61J 1/06* (2013.01); *A61J 1/1468* (2015.05); *C03C 3/087* (2013.01); *C03C 4/20* (2013.01); *C03C 2204/00* (2013.01); *Y10T 428/131* (2015.01)

(58) Field of Classification Search
CPC ........... C03C 3/093; C03C 3/087; C03C 4/20; C03C 2204/00; A61J 1/06; A61J 1/1468; Y10T 428/131
See application file for complete search history.

(56) References Cited

U.S. PATENT DOCUMENTS

| | | | | |
|---|---|---|---|---|
| 3,499,775 | A | * | 3/1970 | Turner .................... C03C 4/085 |
| | | | | 252/588 |
| 4,065,317 | A | * | 12/1977 | Baak ........................ C03C 4/20 |
| | | | | 501/72 |
| 2010/0317506 | A1 | * | 12/2010 | Fechner .................. C03C 3/093 |
| | | | | 501/67 |

| | | | |
|---|---|---|---|
| 2013/0101596 | A1 | 4/2013 | DeMartino et al. |
| 2013/0101853 | A1 | 4/2013 | Drake et al. |
| 2013/0196094 | A1 | 8/2013 | Weeks et al. |
| 2013/0196095 | A1 | 8/2013 | Weeks et al. |
| 2013/0196096 | A1 | 8/2013 | Weeks et al. |
| 2013/0196097 | A1 | 8/2013 | Weeks et al. |
| 2013/0202823 | A1 | 8/2013 | Weeks et al. |
| 2013/0213848 | A1 | 8/2013 | Weeks et al. |
| 2013/0216742 | A1 | 8/2013 | DeMartino et al. |
| 2014/0339122 | A1 | 11/2014 | Weeks et al. |
| 2015/0246846 | A1 | 9/2015 | Choju et al. |
| 2015/0366756 | A1 | 12/2015 | Weeks et al. |
| 2015/0374582 | A1 | 12/2015 | Weeks et al. |
| 2016/0095795 | A1 | 4/2016 | Weeks et al. |
| 2016/0095796 | A1 | 4/2016 | Weeks et al. |
| 2016/0107924 | A1 | 4/2016 | Yamamoto et al. |
| 2017/0029319 | A1 | 2/2017 | Kass et al. |
| 2018/0147114 | A1 | 5/2018 | DeMartino et al. |
| 2018/0265401 | A1 | 9/2018 | Yamamoto et al. |
| 2019/0382303 | A1 | 12/2019 | Grimm et al. |
| 2020/0231489 | A1 | 7/2020 | DeMartino et al. |
| 2022/0048808 | A1 | 2/2022 | Arai |

FOREIGN PATENT DOCUMENTS

| | | |
|---|---|---|
| CN | 106396371 | 2/2017 |
| CN | 110615612 | 12/2019 |
| JP | 2014-37343 | 2/2014 |
| JP | 2015-13793 | 1/2015 |
| JP | 2015-501280 | 1/2015 |
| JP | 2017-218353 | 12/2017 |

(Continued)

OTHER PUBLICATIONS

Machine Translation of WO2016/093176 A1 (Year: 2016).*
International Search Report issued Mar. 17, 2020 in International (PCT) Application No. PCT/JP2020/001704.
English translation of the International Preliminary Report on Patentability and Written Opinion of the International Search Authority issued Jul. 27, 2021 in International (PCT) Application No. PCT/JP2020/001704.
Office Action and Search Report issued Sep. 23, 2022, in corresponding Chinese Patent Application No. 202080008776.1, with English translation of Search Report.
Office Action issued Jul. 6, 2023 in corresponding Chinese Patent Application No. 202080008776.1, with English-language translation of Search Report.

(Continued)

*Primary Examiner* — James C Yager
(74) *Attorney, Agent, or Firm* — Wenderoth, Lind & Ponack, L.L.P.

(57)      ABSTRACT

A glass for a pharmaceutical container of the present invention includes as a glass composition, in terms of mol %, 60% to 85% of $SiO_2$, 3% to 20% of $Al_2O_3$, 0% to 5% of $B_2O_3$, 0% to 9% of $Li_2O$, 0% to 12% of $Na_2O$, 0% to 6% of $K_2O$, 0.1% to 26% of $Li_2O+Na_2O+K_2O$, 0% to 1% of SrO, and 0% to 1% of BaO, having a value for a molar ratio $K_2O/(Li_2O+Na_2O+K_2O)$ of 0.60 or less, and having a value for a molar ratio $Al_2O_3/(Li_2O+Na_2O+K_2O)$ of 50 or less.

17 Claims, No Drawings

(56)     References Cited

FOREIGN PATENT DOCUMENTS

| | | | | |
|---|---|---|---|---|
| JP | 2018-100214 | 6/2018 | | |
| JP | 7530047 | 8/2024 | | |
| WO | 2013/063275 | 5/2013 | | |
| WO | 2013/063280 | 5/2013 | | |
| WO | 2013/063283 | 5/2013 | | |
| WO | 2013/063287 | 5/2013 | | |
| WO | 2013/063290 | 5/2013 | | |
| WO | 2013/063292 | 5/2013 | | |
| WO | 2014/196655 | 12/2014 | | |
| WO | 2016/093176 | 6/2016 | | |
| WO | WO-2016093176 A1 * | 6/2016 | ............ | C03C 3/085 |

OTHER PUBLICATIONS

Notice of Reasons for Refusal issued Apr. 2, 2024 in corresponding Japanese Patent Application No. 2020-568136, with English-language translation.
Rejection Decision issued Nov. 17, 2023 in corresponding Chinese Patent Application No. 202080008776.1, with English translation.
Zhang Yaoming et al., "Complete Book of Glass Fiber and Mineral Cotton", Chemical Industry Press, pp. 41, Mar. 2001, with English machine translation & cited in CA.
Notice of Reasons for Refusal issued Jun. 18, 2025 in corresponding Japanese Patent Application No. 2024-112254, with English-language translation.

* cited by examiner

GLASS FOR MEDICINE CONTAINER, AND GLASS TUBE FOR MEDICINE CONTAINER AND MEDICINE CONTAINER USING SAME

TECHNICAL FIELD

The present invention relates to a glass for a pharmaceutical container excellent in processability and hydrolytic resistance, and a glass tube for a pharmaceutical container and a pharmaceutical container each using the same.

BACKGROUND ART

Various glass containers have hitherto been used as containers in which pharmaceuticals are filled and stored. While the pharmaceuticals are roughly divided into two kinds of drugs: an oral drug and a parenteral drug, in particular, the parenteral drug is filled and stored in a glass container and directly administered to blood of a patient, and hence the glass container is required to have significantly high quality.

In addition, pharmaceutical containers are required not to alter components of a drug filled therein. When glass components are eluted into the drug, the glass components may alter the properties of the drug, and affect the health of a patient and even the life of the patient. Accordingly, the pharmacopoeias of various countries have limits for the elution amounts of the glass components from a glass for a pharmaceutical container.

In view of the foregoing, as a glass material that satisfies the standard for the components eluted from the glass, a borosilicate glass is used.

In recent years, drugs having high drug efficacy have been developed through advances in medical sciences and pharmaceutical sciences. When such drug is filled and stored in a glass container containing $B_2O_3$ in large amount, a phenomenon called delamination, in which an inside surface of the glass container is corroded, and is peeled off and floats as flakes in the drug, poses a problem. This is because, when insoluble foreign matter generated through the delamination or the like is injected into a body of a patient with the drug, there is a risk in that the foreign matter may be harmful to a human body owing to, for example, formation of a thrombus in a blood vessel.

In addition, in order to be capable of adapting also to such drug having high drug efficacy, there is a demand for a glass in which the elution amounts of glass components into water or the drug are smaller than in the case of the related-art glass, and which is more excellent in hydrolytic resistance.

The glass for a pharmaceutical container is required to be processed into a complex shape, such as an ampoule, a vial, a pre-filled syringe, or a cartridge, and hence the glass is simultaneously required to have a low viscosity and excellent processability. Further, also with regard to a working temperature at the time of processing, when the working temperature is high, components contained in the glass are liable to vaporize during the processing, and may contaminate the inside surface of the glass container, even a drug in the glass container.

CITATION LIST

Patent Literature 1: WO 2013/063275 A1

SUMMARY OF INVENTION

Technical Problem

Under the above-mentioned circumstances, in Patent Literature 1, there is proposed a glass in which the content of $B_2O_3$ is reduced for the purpose of reducing the delamination. However, when the content of $B_2O_3$ is reduced, the viscosity of the glass is increased, and hence the glass includes $Na_2O$ in large amount in order to achieve a reduction in viscosity. Accordingly, there is a problem in that the glass is inferior in hydrolytic resistance.

A technical object of the present invention is to obtain a glass for a pharmaceutical container, which achieves both excellent hydrolytic resistance and processability, and a glass tube and a pharmaceutical container each using the same.

Solution to Problem

The inventor of the present invention has made extensive investigations on constituent components of a glass, and as a result, has found that the above-mentioned object can be achieved by strictly restricting the contents of the components. Thus, the finding is proposed as the present invention.

Specifically, in a glass for a pharmaceutical container according to one embodiment of the present invention, the content of $Na_2O$, which is liable to affect the hydrolytic resistance of the glass, is strictly restricted, and hence the hydrolytic resistance of the glass is improved. Further, a value for a molar ratio $K_2O/(Li_2O+Na_2O+K_2O)$ and a value for a molar ratio $Al_2O_3/(Li_2O+Na_2O+K_2O)$ are strictly restricted, and hence both excellent hydrolytic resistance and processability can be achieved.

That is, according to one embodiment of the present invention, there is provided a glass for a pharmaceutical container, comprising as a glass composition, in terms of mol %, 60% to 85% of $SiO_2$, 3% to 20% of $Al_2O_3$, 0% to 5% of $B_2O_3$, 0% to 9% of $Li_2O$, 0% to 12% of $Na_2O$, 0% to 6% of $K_2O$, 0.1% to 26% of $Li_2O+Na_2O+K_2O$, 0% to 1% of SrO, and 0% to 1% of BaO, having a value for a molar ratio $K_2O/(Li_2O+Na_2O+K_2O)$ of 0.60 or less, and having a value for a molar ratio $Al_2O_3/(Li_2O+Na_2O+K_2O)$ of 50 or less. Herein, the "$Li_2O+Na_2O+K_2O$" refers to the total of the contents of $Li_2O$, $Na_2O$, and $K_2O$, the "$K_2O/(Li_2O+Na_2O+K_2O)$" refers to a value obtained by dividing the content of $K_2O$ by the total of the contents of $Li_2O$, $Na_2O$, and $K_2O$, and the "$Al_2O_3/(Li_2O+Na_2O+K_2O)$" refers to a value obtained by dividing the content of $Al_2O_3$ by the total of the contents of $Li_2O$, $Na_2O$, and $K_2O$.

With this configuration, the glass for a pharmaceutical container that achieves both excellent hydrolytic resistance and processability can easily be obtained.

It is preferred that the glass for a pharmaceutical container according to the one embodiment of the present invention comprise as the glass composition, 0% to 7% of $Li_2O$, 0% to 7.9% of $Na_2O$, and 0% to 3% of $K_2O$.

With this configuration, more excellent hydrolytic resistance can easily be obtained.

It is preferred that the glass for a pharmaceutical container according to the one embodiment of the present invention have a total of contents of MgO, CaO, SrO, and BaO of from 0 mol % to 5 mol %.

With this configuration, more excellent hydrolytic resistance can easily be obtained.

It is preferred that the glass for a pharmaceutical container according to the one embodiment of the present invention comprise as the glass composition, in terms of mol %, 0% to 0.5% of MgO, 0% to 0.5% of CaO, 0% to 0.3% of SrO, and 0% to 0.3% of BaO.

With this configuration, more excellent hydrolytic resistance can easily be obtained.

It is preferred that the glass for a pharmaceutical container according to the one embodiment of the present invention have a value for the molar ratio $K_2O/(Li_2O+Na_2O+K_2O)$ of 0.24 or less.

With this configuration, more excellent processability can easily be obtained.

It is preferred that the glass for a pharmaceutical container according to the one embodiment of the present invention have a value for the molar ratio $Al_2O_3/(Li_2O+Na_2O+K_2O)$ of 0.85 or less.

With this configuration, more excellent processability can easily be obtained.

It is preferred that the glass for a pharmaceutical container according to the one embodiment of the present invention have a content of $B_2O_3$ of from 0.01 mol % to 1 mol %.

With this configuration, while the occurrence of the delamination is suppressed, satisfactory processability can be obtained.

It is preferred that the glass for a pharmaceutical container according to the one embodiment of the present invention have a content of $ZrO_2$ of from 0 mol % to 2 mol %.

According to one embodiment of the present invention, there is provided a glass for a pharmaceutical container, comprising as a glass composition, in terms of mol %, 60% to 85% of $SiO_2$, 5% to 17.5% of $Al_2O_3$, 0% to 4% of $B_2O_3$, 0% to 6% of $Li_2O$, 0% to 8.3% of $Na_2O$, 0% to 5% of $K_2O$, 0.1% to 26% of $Li_2O+Na_2O+K_2O$, 0% to 1% of SrO, 0% to 1% of BaO, and 0% to 5% of $MgO+CaO+SrO+BaO$, having a value for a molar ratio $K_2O/(Li_2O+Na_2O+K_2O)$ of 0.24 or less, and having a value for a molar ratio $Al_2O_3/(Li_2O+Na_2O+K_2O)$ of 0.67 or less.

According to one embodiment of the present invention, there is provided a glass for a pharmaceutical container, comprising as a glass composition, in terms of mol %, 60% to 85% of $SiO_2$, 5% to 17.5% of $Al_2O_3$, 0% to 5% of $B_2O_3$, 0% to 7% of $Li_2O$, 0% to 8.3% of $Na_2O$, 0% to 5% of $K_2O$, 0.1% to 26% of $Li_2O+Na_2O+K_2O$, 0% to 1% of SrO, 0% to 1% of BaO, and 0% to 3.7% of $MgO+CaO+SrO+BaO$, having a value for a molar ratio $K_2O/(Li_2O+Na_2O+K_2O)$ of 0.24 or less, and having a molar ratio $Al_2O_3/(Li_2O+Na_2O+K_2O)$ of 0.67 or less.

According to one embodiment of the present invention, there is provided a glass for a pharmaceutical container, comprising as a glass composition, in terms of mol %, 60% to 85% of $SiO_2$, 5% to 20% of $Al_2O_3$, 0% to 5% of $B_2O_3$, 0.1% to 26% of $Li_2O+Na_2O+K_2O$, and 0% to 3% of $MgO+CaO+SrO+BaO$.

According to one embodiment of the present invention, there is provided a glass for a pharmaceutical container, comprising as a glass composition, in terms of mol %, 60% to 85% of $SiO_2$, 3% to 7% of $Al_2O_3$, 0% to 5% of $B_2O_3$, 0% to 7% of $Li_2O$, 0% to 8.3% of $Na_2O$, 0% to 5% of $K_2O$, 0.1% to 26% of $Li_2O+Na_2O+K_2O$, 0% to 1% of SrO, 0% to 1% of BaO, and 0% to 3.7% of $MgO+CaO+SrO+BaO$, having a value for a molar ratio $K_2O/(Li_2O+Na_2O+K_2O)$ of 0.24 or less, having a value for a molar ratio $Al_2O_3/(Li_2O+Na_2O+K_2O)$ of 0.5 or less, and having a value for a molar ratio $SiO_2/Al_2O_3$ of 16 or less.

In addition, it is preferred that the glass for a pharmaceutical container according to the embodiments of the present invention be classified as at least HGA 1 in a hydrolytic resistance test (washing with acetone) in conformity with ISO 720.

In the present invention, the "hydrolytic resistance test (washing with acetone) in conformity with ISO 720" refers to the following test.

(1) A glass sample is pulverized in an alumina mortar and classified into a particle diameter of from 300 μm to 425 μm with a sieve.

(2) The resultant powder sample is washed with acetone and dried in an oven at 140° C.

(3) 10 g of the powder sample after the drying is loaded into a quartz flask, 50 mL of purified water is further added thereto, and the flask is covered with a closure, followed by treatment in an autoclave. The treatment is performed under the following treatment conditions: a temperature is increased at a rate of 1° C./min from 100° C. to 121° C., is then retained at 121° C. for 30 minutes, and is reduced at a rate of 0.5° C./min to 100° C.

(4) After the treatment in an autoclave, the solution in the quartz flask is transferred to another beaker, the inside of the quartz flask is further washed with 15 mL of purified water three times, and also the washing liquid is added to the beaker.

(5) A methyl red indicator is added to the beaker, and the content is titrated with a 0.02 mol/L hydrochloric acid aqueous solution.

(6) The amount of the hydrochloric acid aqueous solution is converted to an alkali elution amount per gram of glass on the assumption that 1 mL of the 0.02 mol/L hydrochloric acid aqueous solution corresponds to 620 μg of $Na_2O$.

The "classified as at least HGA 1 in a hydrolytic resistance test (washing with acetone) in conformity with ISO 720" means that the alkali elution amount per gram of glass in terms of $Na_2O$ determined through the above-mentioned test is 62 μg/g or less.

It is preferred that the glass for a pharmaceutical container according to the embodiments of the present invention have a working point of 1,300° C. or less. The "working point" means a temperature at which the glass has a viscosity of $10^{4.0}$ dPa·s.

With this configuration, a processing temperature at the time of processing into a pharmaceutical container or the like is not required to be increased, and hence the vaporization amounts of glass components during the processing can be reduced, with the result that the contamination of an inside surface of the container can easily be suppressed.

It is preferred that a glass tube for a pharmaceutical container according to one embodiment of the present invention comprise the above-mentioned glass for a pharmaceutical container.

It is preferred that a pharmaceutical container according to one embodiment of the present invention comprise the above-mentioned glass for a pharmaceutical container. The glass for a pharmaceutical container according to the embodiments of the present invention has high hydrolytic resistance. Further, a processing temperature can be reduced, and hence the vaporization amounts of glass components during processing can be reduced, with the result that the contamination of the inside surface of the container can easily be suppressed. As a result, the pharmaceutical container, which is excellent in hydrolytic resistance and excellent even in chemical durability, can easily be obtained.

DESCRIPTION OF EMBODIMENTS

The reasons why the composition ranges of components are limited are described. In the following description, the expression "%" means "mold" unless otherwise specified.

$SiO_2$ is one of components that form a network structure of a glass. When the content of $SiO_2$ is too small, it becomes difficult to vitrify the glass. In addition, a thermal expansion coefficient is increased, and thermal shock resistance is liable to be reduced. Meanwhile, when the content of $SiO_2$ is too large, a liquidus temperature is increased, and the glass is liable to devitrify. Accordingly, the content of $SiO_2$ is preferably from 60% to 85%, from 65% to 85%, or from 68% to 83%, particularly preferably from 70% to 80%.

$Al_2O_3$ is one of the components that form the network structure of the glass, and has an effect of improving the hydrolytic resistance of the glass. When the content of $Al_2O_3$ is too small, the hydrolytic resistance is liable to be degraded. Meanwhile, when the content of $Al_2O_3$ is too large, a viscosity is increased. Accordingly, the content of $Al_2O_3$ is preferably from 3% to 20%, from 4% to 20%, from 4% to 17.5%, from 4.5% to 17.5%, from 5% to 15%, from 5.3% to 14%, from 5.4% to 13%, from 5.5% to 12.4%, from 5.6% to 120, from 5.7% to 11.50, from 5.8% to 11%, or from 5.9% to 10%, particularly preferably from 6% to 9%.

$B_2O_3$ has an effect of reducing the viscosity of the glass to improve meltability and processability. However, $B_2O_3$ is considered as one of factors for causing delamination, and when the content thereof is too large, delamination resistance is degraded, and flakes are liable to be generated. Accordingly, the content of $B_2O_3$ is preferably from 0% to 5%, from 0.01% to 4%, from 0.02% to 3%, from 0.03% to 2%, from 0.04% to 1%, or from 0.04% to 0.8%, particularly preferably from 0.05% to 0.5%.

$Li_2O$, $Na_2O$, and $K_2O$, which are alkali metal oxides ($R_2O$), each have an effect of reducing the viscosity of the glass to improve the processability and the meltability. The lower limit of the total of the contents of $R_2O$ is preferably 0.1% or more, 0.5% or more, 1% or more, 2% or more, 3% or more, 4% or more, 4.5% or more, 5% or more, 5.5% or more, 6% or more, 6.5% or more, 7% or more, or 7.5% or more, particularly preferably 8% or more. When the processability of the glass is particularly emphasized, the lower limit of the total of the contents of $R_2O$ is 8.5% or more, 9% or more, 9.5% or more, 10% or more, 10.5% or more, or 11% or more. Meanwhile, when the total of the contents of those components is too large, the hydrolytic resistance of the glass is degraded, or the thermal expansion coefficient is increased, and the thermal shock resistance is reduced. Accordingly, the upper limit of the total of the contents of $R_2O$ is preferably 26% or less, 23% or less, 20% or less, 18% or less, 17.5% or less, 17% or less, less than 17%, 16% or less, 15% or less, 14% or less, 13.9% or less, 13% or less, or 12% or less, particularly preferably 11% or less.

As described above, $Li_2O$ has an effect of reducing the viscosity of the glass to improve the processability and the meltability. Among $R_2O$, $Li_2O$ has the highest effect of reducing the viscosity of the glass, and the effect of reducing the viscosity of the glass becomes lower in the order of $Na_2O$ and $K_2O$. However, when the content of $Li_2O$ is too large, the hydrolytic resistance is liable to be degraded. Accordingly, the content of $Li_2O$ is preferably from 0% to 9%, from 0% to 8%, from 0% to 7%, from 0% to 6.5%, from 0% to 6.3%, from 0% to 6.1%, from 0% to 6%, from 0% to 5.9%, from 0% to 5.8%, from 0% to 5.7%, from 0% to 5.5%, from 0% to 5%, from 0% to 4.5%, or from 0% to 4%, particularly preferably from 0% to 3.5%. In particular, with regard to devitrification resistance, the glass is much less liable to devitrify when the content of $Li_2O$ is 6% or less.

When the processability of the glass is emphasized, the content of $Li_2O$ may be preferably from 0.1% to 9%, from 0.5% to 8%, from 1% to 7%, from 2% to 6.5%, from 2.5% to 6.3%, from 3% to 6.1%, or from 3.5% to 6%, particularly preferably from 4% to 5%.

Further, when the balance between the processability and the hydrolytic resistance of the glass is emphasized, the content of $Li_2O$ is preferably from 2% to 8%, or from 2.5% to 7%, particularly preferably from 3% to 6.5%.

As with $Li_2O$, $Na_2O$ has an effect of reducing the viscosity of the glass to improve the processability and the meltability. In addition, when the content of $Na_2O$ is too small, the devitrification resistance is reduced in some cases. Meanwhile, as described above, $Na_2O$ is a component that particularly degrades the hydrolytic resistance when the content thereof is too large. Accordingly, the content of $Na_2O$ is preferably from 0% to 12%, from 0% to 10%, from 0% to 9%, from 0% to 8.5%, from 0% to 8.3%, from 0% to 8%, from 0% to 7.9%, from 0% to 7.5%, from 0% to 7%, from 0% to 6.5%, from 0% to 6%, or from 0% to 5.5%, particularly preferably from 0% to 5%.

When the processability of the glass is emphasized, the content of $Na_2O$ may be preferably from 0.1% to 12%, from 0.5% to 11%, from 1% to 10%, from 2% to 9%, from 2.5% to 8.5%, from 3% to 8%, from 3.5% to 7.9%, from 4% to 7.5%, or from 4.5% to 7%, particularly preferably from 5% to 6.5%.

$K_2O$ has an effect of reducing the viscosity of the glass to improve the processability and the meltability, although the effect is lower than those of $Li_2O$ and $Na_2O$. However, when the content of $K_2O$ is too large, the hydrolytic resistance is degraded. Meanwhile, when the content of $K_2O$ is too small, the devitrification resistance is reduced in some cases. Accordingly, the content of $K_2O$ is preferably from 0% to 6%, from 0% to 5%, from 0% to 4%, from 0% to 3%, from 0% to 2.9%, from 0% to 2.8%, from 0% to 2.7%, from 0% to 2.6%, from 0% to 2.5%, or from 0% to 2%, particularly preferably from 0% to less than 2%.

When the processability of the glass is emphasized, the content of $K_2O$ may be preferably from 0.01% to 11%, from 0.05% to 10%, from 0.1% to 8%, from 0.5% to 6%, from 0.8% to 5.5%, from 1% to 5%, from 1.2% to 4%, or from 1.4% to 3.5%, particularly preferably from 1.5% to 3%.

Among the above-mentioned alkali metal oxides ($R_2O$), $Li_2O$ has the highest effect of reducing the viscosity of the glass, and the effect of reducing the viscosity of the glass becomes lower in the order of $Na_2O$ and $K_2O$. Accordingly, from the viewpoint of reducing the viscosity of the glass, it is preferred that the following relationship be established among their contents: $Li_2O \geq Na_2O \geq K_2O$, $Li_2O \geq Na_2O > K_2O$, or $Li_2O > Na_2O \geq K_2O$, and it is particularly preferred that the following relationship be established: $Li_2O > Na_2O > K_2O$. In addition, when the ratio of $K_2O$ is too large, it becomes difficult to keep both the viscosity of the glass and the hydrolytic resistance satisfactory. Accordingly, also from the viewpoint of balancing the viscosity and the hydrolytic resistance, it is preferred that the following relationship be established: $Na_2O > K_2O$.

When the ratio of $Li_2O$ with respect to the alkali metal oxides ($R_2O$) contained in the glass is too large, the devitrification resistance of the glass is reduced. Accordingly, in an embodiment, from the viewpoint of the devitrification resistance, the contents of the alkali metal oxides ($R_2O$) may be set so as to satisfy the following relationship: $Na_2O > Li_2O$. In addition, $K_2O$ has the highest effect of improving the devitrification resistance of the glass, and the effect of improving the devitrification resistance of the glass becomes lower in the order of $Na_2O$ and $Li_2O$. From the viewpoint of balancing the hydrolytic resistance and the devitrification resistance of the glass, it is preferred that the following relationship be established: $Li_2O \geq Na_2O \geq K_2O$, $Li_2O \geq K_2O > Na_2O$, or $Li_2O > Na_2O \geq K_2O$, and it is particularly preferred that the following relationship be established: $Li_2O > K_2O > Na_2O$.

In addition, when the ratio of $K_2O$ with respect to the alkali metal oxides ($R_2O$) is too large, the effect of reducing the viscosity of the glass is reduced. Accordingly, the upper limit of the molar ratio $K_2O/(Li_2O+Na_2O+K_2O)$ is preferably 0.60 or less, 0.50 or less, 0.40 or less, 0.24 or less, 0.22 or less, 0.21 or less, or 0.18 or less, particularly preferably 0.15 or less. With this configuration, the viscosity of the glass can easily be reduced. Meanwhile, when the value for the molar ratio $K_2O/(Li_2O+Na_2O+K_2O)$ is too low, there is a risk in that the hydrolytic resistance of the glass may be degraded. Accordingly, the lower limit of the molar ratio $K_2O/(Li_2O+Na_2O+K_2O)$ is preferably more than 0, or 0.01 or more, particularly preferably 0.03 or more, 0.05 or more, 0.8 or more, 0.1 or more, or 0.13 or more.

When the content of $Al_2O_3$ is increased, the hydrolytic resistance is improved, but meanwhile, the viscosity of the glass is increased. In addition, when the contents of $Li_2O$, $Na_2O$, and $K_2O$ are increased, the hydrolytic resistance is degraded, but meanwhile, the viscosity of the glass is reduced. In the present invention, in order to balance the hydrolytic resistance and the processability of the glass, it is required to strictly control the balance between the contents of the components relating to those characteristics. Accordingly, the value for the molar ratio $Al_2O_3/(Li_2O+Na_2O+K_2O)$ is preferably 50 or less, 40 or less, 30 or less, 20 or less, 10 or less, 5 or less, 3 or less, 2 or less, 1.2 or less, from 0 to 1, from 0 to 0.85, from 0 to 0.8, from more than 0 to 0.74, from 0.01 to 0.7, from 0.1 to 0.67, from 0.2 to 0.65, from 0.3 to 0.61, from 0.33 to 0.60, from 0.34 to 0.59, or from 0.4 to 0.55, particularly preferably from more than 0.4 to 0.5. When the contents of $Al_2O_3$, and $Li_2O$, $Na_2O$, and $K_2O$ are limited as described above, both satisfactory hydrolytic resistance and processability can easily be achieved. Particularly when the value for the molar ratio $Al_2O_3/(Li_2O+Na_2O+K_2O)$ is 0.67 or less, the hydrolytic resistance and processability can be balanced more easily.

When the content of $Al_2O_3$ is too small with respect to $SiO_2$, the hydrolytic resistance of the glass is degraded, and besides, also the devitrification resistance is degraded. In the present invention, in order to keep the devitrification resistance satisfactory in addition to the hydrolytic resistance and the processability of the glass, it is desired to strictly control the component balance between $SiO_2$ and $Al_2O_3$. Accordingly, the upper limit of the range of the molar ratio $SiO_2/Al_2O_3$ is preferably 30 or less, 20 or less, 18 or less, 17 or less, or 16 or less, particularly preferably 15 or less. In addition, when the content of $Al_2O_3$ is too large with respect to $SiO_2$, it becomes difficult to balance the hydrolytic resistance and the processability. Accordingly, the lower limit of the range of the molar ratio $SiO_2/Al_2O_3$ is preferably 3 or more, 4 or more, 5 or more, 6 or more, 7 or more, 8 or more, 9 or more, 10 or more, or 11 or more, particularly preferably 12 or more.

In order to balance the hydrolytic resistance and the processability of the glass, it is preferred to restrict the balance between the content of $SiO_2$, which is a component contained at the largest content in the present invention, and the contents of $Li_2O$, $Na_2O$, and $K_2O$, which each have an action of reducing the viscosity. Accordingly, the value for the molar ratio $SiO_2/(Li_2O+Na_2O+K_2O)$ is preferably 10 or less, 8 or less, 7.9 or less, 7 or less, 6.9 or less, 6.5 or less, 6.1 or less, 6.0 or less, or 5.9 or less, particularly preferably 5.7 or less. When the contents of $SiO_2$, and $Li_2O$, $Na_2O$, and $K_2O$ are limited as described above, both satisfactory hydrolytic resistance and processability can easily be achieved. Particularly when the value for the molar ratio $SiO_2/(Li_2O+Na_2O+K_2O)$ is 6.9 or less, the hydrolytic resistance and the processability can be balanced more easily.

Further, it is preferred to appropriately restrict the value for $Li_2O/(Na_2O+K_2O)$ serving as the alkali metal oxides ($R_2O$). With this configuration, while the effect of $Li_2O$, which has a high effect of reducing the viscosity among the alkali metal oxides, is exhibited, the influence of $Na_2O$, which particularly degrades the hydrolytic resistance, can be suppressed. Accordingly, the lower limit of $Li_2O/(Na_2O+K_2O)$ is 0.1 or more, 0.2 or more, 0.3 or more, 0.4 or more, 0.5 or more, or 0.6 or more, particularly preferably 0.7 or more. Meanwhile, when the value for $Li_2O/(Na_2O+K_2O)$ is too high, a raw material cost is increased. Accordingly, the upper limit of the molar ratio $Li_2O/(Na_2O+K_2O)$, which is the molar ratio between the content of $Li_2O$ and the total of the contents of $Na_2O$ and $K_2O$, is preferably 2.0 or less, 1.5 or less, 1.2 or less, 1.1 or less, 1.0 or less, less than 1.0, 0.9 or less, 0.8 or less, or less than 0.8.

MgO, CaO, SrO, and BaO, which are alkaline earth metal oxides (R'O), each have an effect of reducing the viscosity of the glass. In addition, MgO, CaO, SrO, and BaO each also affect the hydrolytic resistance. When the contents of those components are too large, the hydrolytic resistance and the devitrification resistance of the glass are reduced. Besides, there is a risk in that R'O eluted from the glass into a drug may precipitate as a carbonate or a sulfate. Accordingly, the total content of R'O is preferably from 0% to 10%, from 0% to 5%, from 0% to 4%, from 0% to 3.7%, from 0% to 3%, from 0% to 2%, from 0% to 1%, from 0% to 0.9%, from 0% to 0.8%, from 0% to 0.7%, from 0% to 0.6%, from 0% to 0.5%, from 0% to 0.4%, from 0% to 0.3%, from 0% to 0.2%, from 0% to 0.1%, from 0% to 0.01%, or less than 0.01%. It is particularly preferred that the glass be free of R'O. In the present invention, the "free of" means that the component is not positively added, and does not exclude its inclusion as an inevitable impurity.

Herein, the ease of precipitation of the carbonate or the sulfate of the R'O depends on the solubility of each salt. Specifically, MgO has the highest solubility, and the solubility becomes lower in the order of CaO, SrO, and BaO. Accordingly, MgO is least liable to precipitate as a salt, and BaO is most liable to precipitate as a salt. Accordingly, when attention is focused on the solubility, it is preferred that the following relationship be established among the contents of R'O: $MgO \geq CaO \geq SrO \geq BaO$, and it is more preferred that the following relationship be established: $MgO > CaO > SrO > BaO$.

Meanwhile, BaO has the highest effect of reducing the viscosity of the glass, and the effect of reducing the viscosity of the glass becomes lower in the order of SrO, CaO, and MgO. Accordingly, when the processability is emphasized, it is preferred that the following relationship be established among the contents of R'O: $BaO \geq SrO \geq CaO \geq MgO$, and it is more preferred that the following relationship be established: $BaO > SrO > CaO > MgO$.

In addition, in the glass for a pharmaceutical container of the present invention, it is preferred that the content of MgO be restricted. As described above, MgO is a component that is less liable to precipitate as a salt because the carbonate or the sulfate thereof has a high solubility. However, MgO is also a component that has the following risk: a Mg ion is liable to react with hydrated silicic acid, and hence when the Mg ion in the glass is eluted, the Mg ion may react with hydrated silicic acid generated on the surface of the glass to form an insoluble hydrated magnesium silicate film. The film may be peeled off by vibration or the like to become flake-like insoluble foreign matter. In addition, when the content of MgO is too large, the hydrolytic resistance is degraded. Accordingly, in the present invention, it is preferred to strictly restrict the content of MgO. Accordingly, the content of MgO is preferably from 0% to 10%, from 0% to 8%, from 0% to 5%, from 0% to 3%, from 0% to 1%, from 0% to 0.9%, from 0% to 0.8%, from 0% to 0.7%, from 0% to 0.6%, from 0% to 0.5%, from 0% to 0.4%, from 0% to 0.3%, from 0% to 0.2%, from 0% to 0.1%, from 0% to 0.05%, from 0% to 0.03%, from 0% to less than 0.03%, from 0% to 0.01%, or from 0% to less than 0.01%. In addition, it is preferred that the glass be free of MgO. When the processability of the glass is particularly emphasized, MgO may be contained at 0.01% or more.

In addition, in the glass fora pharmaceutical container of the present invention, it is preferred to strictly restrict the content of CaO in order to improve the hydrolytic resistance. The content of CaO is preferably from 0% to 10%, from 0% to 8%, from 0% to 5%, from 0% to 3%, from 0% to 1%, from 0% to 0.9%, from 0% to 0.8%, from 0% to 0.7%, from 0% to 0.6%, from 0% to 0.5%, from 0% to 0.4%, from 0% to 0.3%, from 0% to 0.2%, from 0% to 0.1%, from 0% to 0.05%, from 0% to 0.03%, from 0% to less than 0.03%, from 0% to 0.01%, or from 0% to less than 0.01%. In addition, it is preferred that the glass be free of CaO. When the processability of the glass is particularly emphasized, CaO may be contained at 0.01% or more.

In addition, in the glass for a pharmaceutical container of the present invention, it is preferred to strictly restrict the content of SrO in order to suppress the precipitation of the carbonate or the sulfate and improve the hydrolytic resistance. The content of SrO is preferably from 0% to 1%, from 0% to 0.9%, from 0% to 0.8%, from 0% to 0.7%, from 0% to 0.6%, from 0% to 0.5%, from 0% to 0.4%, from 0% to 0.3%, from 0% to 0.2%, from 0% to 0.1%, from 0% to 0.01%, or from 0% to less than 0.01%. It is particularly preferred that the glass be free of SrO.

In addition, in the glass fora pharmaceutical container of the present invention, it is preferred to strictly restrict the content of BaO in order to suppress the precipitation of the carbonate or the sulfate and improve the hydrolytic resistance. The content of BaO is preferably from 0% to 1%, from 0% to 0.9%, from 0% to 0.8%, from 0% to 0.7%, from 0% to 0.6%, from 0% to 0.5%, from 0% to 0.4%, from 0% to 0.3%, from 0% to 0.2%, from 0% to 0.1%, from 0% to 0.01%, or from 0% to less than 0.01%. It is particularly preferred that the glass be free of BaO.

In addition, as described above, MgO is a component that is less liable to precipitate as a salt because the carbonate or the sulfate thereof has a high solubility, and is also a component that has a risk of forming an insoluble hydrated magnesium silicate film because a Mg ion is liable to react with hydrated silicic acid. Accordingly, in the glass for a pharmaceutical container of the present invention, it is preferred to restrict the value for the molar ratio MgO/(MgO+CaO+SrO+BaO). The value for the molar ratio MgO/(MgO+CaO+SrO+BaO) is preferably 1 or less, less than 1, 0.9 or less, 0.8 or less, 0.7 or less, 0.6 or less, 0.5 or less, less than 0.5, 0.4 or less, 0.3 or less, 0.2 or less, or 0.1 or less, particularly preferably 0.

In addition, the value for MgO+CaO is preferably from 0% to 10%, from 0% to 5%, from 0% to 4%, from 0% to 3.7%, from 0% to 3%, from 0% to 2%, from 0% to 1%, from 0% to 0.9%, from 0% to 0.8%, from 0% to 0.7%, from 0% to 0.6%, from 0% to 0.5%, from 0% to 0.4%, from 0% to 0.3%, from 0% to 0.2%, from 0% to 0.1%, from 0% to 0.01%, or from 0% to less than 0.01%. It is particularly preferred that the glass be free of MgO+CaO. With this configuration, the carbonate or the sulfate is less liable to precipitate. The "MgO+CaO" refers to the total of the contents of MgO and CaO.

In addition, the molar ratio MgO/CaO, which is the molar ratio in content of MgO to CaO, is preferably less than 9.0, 8.0 or less, 6.0 or less, less than 5.0, less than 3.0, 1.0 or less, less than 1.0, or 0.5 or less, more preferably 0.9 or less, less than 0.7, less than 0.5, less than 0.4, less than 0.3, less than 0.2, or less than 0.1. With this configuration, the hydrolytic resistance can be improved. In addition, as described above, in the present invention, while MgO has a risk of forming an insoluble hydrated magnesium silicate film, CaO is a component that is less liable to react with $SiO_2$, and has a lower risk of forming an insoluble film, as compared to MgO. Accordingly, when the molar ratio MgO/CaO is restricted, the safety of a container can be improved. In addition, the viscosity of the glass can also be reduced, and hence excellent processability can be obtained.

In addition, in the glass fora pharmaceutical container of the present invention, in order to balance the hydrolytic resistance and the processability, it is more preferred to restrict the balance between the content of CaO and the content of $Li_2O$. The molar ratio $CaO/Li_2O$, which is the molar ratio between the content of CaO and the content of $Li_2O$, is preferably 2.0 or less, 1.5 or less, 1.2 or less, 1.1 or less, 1.0 or less, less than 1.0, 0.9 or less, 0.8 or less, 0.7 or less, 0.6 or less, 0.5 or less, 0.4 or less, 0.3 or less, 0.2 or less, or 0.1 or less, particularly preferably 0.

In addition, in the glass fora pharmaceutical container of the present invention, the total of the contents of $SiO_2$, $Al_2O_3$, $B_2O_3$, $Li_2O$, $Na_2O$, $K_2O$, MgO, CaO, SrO, and BaO is preferably 90% or more, 93% or more, 95% or more, 96% or more, 97% or more, 98% or more, or 98.5% or more, particularly preferably 99% or more. With this configuration, the effects exhibited by the above-mentioned components can be obtained efficiently, and hence both excellent hydrolytic resistance and processability can be achieved more easily.

In addition, the glass for a pharmaceutical container of the present invention may comprise, as the glass composition, any other component than those described above. For example, in order to improve the alkali resistance of the glass, the glass may comprise $ZrO_2$. However, when the content of $ZrO_2$ is too large, the viscosity of the glass is increased, and besides, also the devitrification resistance is reduced. When $ZrO_2$ is contained, the content thereof is preferably from 0% to 3%, from 0% to 2.5%, from 0% to 2%, from 0% to 1.5%, or from 0.1% to 0.8%, particularly preferably from 0.2% to 0.6%.

In addition, the glass for a pharmaceutical container of the present invention may contain ZnO. ZnO has an effect of reducing the viscosity of the glass, but meanwhile, affects the hydrolytic resistance of the glass when the content thereof is too large. In the present invention, the content of ZnO is preferably from 0% to 4%, or from 0% to 1%. The glass is free of ZnO if possible.

In addition, when the glass is to be colored, $TiO_2$ and $Fe_2O_3$ may be added to batch raw materials. In this case, a normal value for the sum of the contents of $TiO_2$ and $Fe_2O_3$ is preferably 7% or less, 6% or less, 5% or less, or 1% or less, more preferably 0.5% or less.

In addition, the glass may comprise one or more kinds selected from, for example, F, Cl, $Sb_2O_3$, $SnO_2$, and $SO_3$ as a fining agent. In this case, a normal value for the contents of the fining agents in terms of their sum is preferably 5% or less, particularly preferably 1% or less, further particularly preferably 0.5% or less.

In addition, in order to improve the chemical durability, a viscosity at high temperature, and the like, $P_2O_5$, $Cr_2O_3$, PbO, $La_2O_3$, $WO_3$, $Nb_2O_5$, $Y_2O_3$, and the like may each be added at 3% or less, 2% or less, 1% or less, less than 1%, or 0.5% or less.

In addition, components such as $H_2$, $CO_2$, CO, $H_2O$, He, Ne, Ar, and $N_2$ may each be contained up to 0.1% as impurities. In addition, the amounts of precious metal elements, such as Pt, Rh, and Au, to be mixed in are each preferably 500 ppm or less, more preferably 300 ppm or less.

In addition, in addition to the above-mentioned composition ranges, there may be given, for example, a glass comprising as a glass composition, in terms of mol %, 60% to 85% of $SiO_2$, 5% to 17.5% of $Al_2O_3$, 0% to 4% of $B_2O_3$, 0% to 6% of $Li_2O$, 0% to 8.3% of $Na_2O$, 0% to 5% of $K_2O$, 0.1% to 26% of $Li_2O+Na_2O+K_2O$, 0% to 1% of SrO, 0% to 1% of BaO, and 0% to 5% of $MgO+CaO+SrO+BaO$, having a value for a molar ratio $K_2O/(Li_2O+Na_2O+K_2O)$ of 0.24 or less, and having a value for a molar ratio $Al_2O_3/(Li_2O+Na_2O+K_2O)$ of 0.67 or less. The reasons why the composition ranges of the components are limited and preferred ranges thereof overlap with the contents having already been described, and hence the description thereof is omitted here.

In addition, in addition to the above-mentioned composition ranges, there may also be given, for example, a glass comprising as a glass composition, in terms of mol %, 60% to 85% of $SiO_2$, 5% to 17.5% of $Al_2O_3$, 0% to 5% of $B_2O_3$, 0% to 7% of $Li_2O$, 0% to 8.3% of $Na_2O$, 0% to 5% of $K_2O$, 0.1% to 26% of $Li_2O+Na_2O+K_2O$, 0% to 1% of SrO, 0% to 1% of BaO, and 0% to 3.7% of $MgO+CaO+SrO+BaO$, having a value for a molar ratio $K_2O/(Li_2O+Na_2O+K_2O)$ of 0.24 or less, and having a molar ratio $Al_2O_3/(Li_2O+Na_2O+K_2O)$ of 0.67 or less. The reasons why the composition ranges of the components are limited and preferred ranges thereof overlap with the contents having already been described, and hence the description thereof is omitted here.

In addition, as a glass for a pharmaceutical container according to another embodiment of the present invention, in addition to the above-mentioned composition ranges, there may also be given, for example, a glass comprising as a glass composition, in terms of mol %, 60% to 85% of $SiO_2$, 5% to 20% of $Al_2O_3$, 0% to 5% of $B_2O_3$, 0.1% to 26% of $Li_2O+Na_2O+K_2O$, and 0% to 3% of $MgO+CaO+SrO+BaO$. The reasons why the composition ranges of the components are limited and preferred ranges thereof overlap with the contents having already been described, and hence the description thereof is omitted here.

Further, as a glass for a pharmaceutical container according to another embodiment of the present invention, in addition to the above-mentioned composition ranges, there may also be given, for example, a glass comprising as a glass composition, in terms of mol %, 60% to 85% of $SiO_2$, 3% to 7% of $Al_2O_3$, 0% to 5% of $B_2O_3$, 0% to 7% of $Li_2O$, 0% to 8.3% of $Na_2O$, 0% to 5% of $K_2O$, 0.1% to 26% of $Li_2O+Na_2O+K_2O$, 0% to 1% of SrO, 0% to 1% of BaO, and 0% to 3.7% of $MgO+CaO+SrO+BaO$, having a value for a molar ratio $K_2O/(Li_2O+Na_2O+K_2O)$ of 0.24 or less, having a value for a molar ratio $Al_2O_3/(Li_2O+Na_2O+K_2O)$ of 0.5 or less, and having a value for a molar ratio $SiO_2/Al_2O_3$ of 16 or less. The reasons why the composition ranges of the components are limited and preferred ranges thereof overlap with the contents having already been described, and hence the description thereof is omitted here.

In addition, the glass for a pharmaceutical container of the present invention is preferably classified as at least HGA 1 in a hydrolytic resistance test (washing with acetone) in conformity with ISO 720.

In addition, the glass for a pharmaceutical container of the present invention has an alkali elution amount in terms of $Na_2O$ in the hydrolytic resistance test (washing with acetone) in conformity with ISO 720 of preferably less than 62 µg/g, 60 µg/g or less, 57 µg/g or less, 55 µg/g or less, or 53 µg/g or less, particularly preferably 50 µg/g or less. When the alkali elution amount is too large, in the case where the glass is processed into an ampoule or a vial, and a drug is filled and stored therein, there is a risk in that components of the drug may be altered by an alkali component eluted from the glass.

In addition, the alkali resistance of the glass serves as one of indicators for judging resistance to delamination. The glass for a pharmaceutical container of the present invention preferably has at least class 2 alkali resistance in a test in conformity with ISO 695. Herein, the "alkali resistance test in conformity with ISO 695" refers to the following test.

(1) A glass sample piece in which all surfaces thereof have been mirror finished and which has a surface area of A $cm^2$ (where A represents from 10 $cm^2$ to 15 $cm^2$) is prepared. First, as pretreatment for the sample, a solution in which hydrofluoric acid (40 wt %) and hydrochloric acid (2 mol/L) are mixed at a volume ratio of 1:9 is prepared. The sample is immersed in the solution, and stirred for 10 minutes with a magnetic stirrer. The sample is taken out therefrom, ultrasonically washed with purified water for 2 minutes three times, and ultrasonically washed with ethanol for 1 minute twice.

(2) After that, the sample is dried in an oven at 110° C. for 1 hour, and left to cool in a desiccator for 30 minutes.

(3) The mass m1 of the sample is measured at an accuracy of ±0.1 mg and recorded.

(4) 800 mL of a solution in which a sodium hydroxide aqueous solution (1 mol/L) and a sodium carbonate aqueous solution (0.5 mol/L) are mixed at a volume ratio of 1:1 is prepared. The solution is loaded into a container made of stainless steel, and boiled with a heating mantle. While being hung with a platinum wire, the sample is loaded thereinto and retained for 3 hours. The sample is taken out therefrom, ultrasonically washed with purified water for 2 minutes three times, and ultrasonically washed with ethanol for 1 minute twice. After that, the sample is dried in an oven at 110° C. for 1 hour, and left to cool in a desiccator for 30 minutes.

(5) The mass m2 of the sample is measured at an accuracy of ±0.1 mg and recorded.

(6) The loss in mass per unit area is calculated from the masses m1 and m2 (mg) before and after the loading into the boiled alkali solution and the surface area A ($cm^2$) of the sample based on the following calculation formula, and is used as a measurement value for the alkali resistance test.

$$(\text{Loss in mass per unit area})=100\times(m1-m2)/A$$

The "class 2 alkali resistance in a test in conformity with ISO 695" means that the loss in mass per unit area determined as described above is 175 mg/$dm^2$ or less. When the loss in mass per unit area determined as described above is 75 mg/$dm^2$ or less, the glass "has class 1 alkali resistance in a test in conformity with ISO 695." In the glass for a pharmaceutical container of the present invention, the value for the loss in mass per unit area is preferably 130 mg/dm$^2$ or less, particularly preferably 75 mg/dm$^2$ or less.

The delamination often occurs when a drug is filled and stored in a glass container in combination with a solution, such as a citrate or phosphate buffer solution, which behaves as if it had strong alkalinity even at a pH around neutral. When the loss in mass per unit area determined through the test in conformity with ISO 695 is more than 175 mg/dm$^2$, the possibility that the delamination occurs is increased. Accordingly, in the glass for a pharmaceutical container of the present invention, the loss in mass per unit area is preferably 130 mg/dm$^2$ or less, particularly preferably 75 mg/dm$^2$ or less.

In addition, in the glass fora pharmaceutical container of the present invention, the loss in mass per unit area in an acid resistance test in conformity with YBB00342004 is preferably 1.5 mg/dm$^2$ or less, particularly preferably 0.7 mg/dm$^2$ or less. When the loss in mass is increased, in the case where a bottle container, such as an ampoule or a vial, is produced, and a drug solution is filled and stored therein, there is a risk in that components of the drug solution may be altered owing to significant increases in elution amounts of glass components. The "acid resistance test in conformity with YBB00342004" refers to the following test.

Herein, the "acid resistance test in conformity with YBB00342004" refers to the following test.

(1) A glass sample piece in which all surfaces thereof have been mirror finished and which has a surface area of A cm$^2$ (where A represents 100±5 cm$^2$) is prepared. First, as pretreatment for the sample, a solution in which hydrofluoric acid (40 wt %) and hydrochloric acid (2 mol/L) are mixed at a volume ratio of 1:9 is prepared. The sample is immersed in the solution, and stirred for 10 minutes with a magnetic stirrer. The sample is taken out therefrom, ultrasonically washed with purified water for 2 minutes three times, and ultrasonically washed with ethanol for 1 minute twice.

(2) After that, the sample is dried in an oven at 110° C. for 1 hour, and left to cool in a desiccator for 30 minutes.

(3) The mass m1 of the sample is measured at an accuracy of ±0.1 mg and recorded.

(4) 800 mL of a hydrochloric acid solution (6 mol/L) is prepared. The solution is loaded into a container made of silica glass, and boiled with an electric heater. While being hung with a platinum wire, the sample is loaded thereinto and retained for 6 hours. The sample is taken out therefrom, ultrasonically washed with purified water for 2 minutes three times, and ultrasonically washed with ethanol for 1 minute twice. After that, the sample is dried in an oven at 110° C. for 1 hour, and left to cool in a desiccator for 30 minutes.

(5) The mass m2 of the sample is measured at an accuracy of ±0.1 mg and recorded.

(6) The half loss in mass per unit area is calculated from the masses m1 and m2 (mg) before and after the loading into the boiled acid solution and the surface area A (cm$^2$) of the sample based on the following calculation formula, and is used as a measurement value for the acid resistance test.

$$\text{(Loss in mass per unit area)} = \tfrac{1}{2} \times 100 \times (m1 - m2)/A$$

In addition, the glass for a pharmaceutical container of the present invention has a working point of preferably 1,350° C. or less, 1,300° C. or less, or 1,260° C. or less, particularly preferably 1,250° C. or less. When the working point is increased, a processing temperature at the time of processing of a glass tube into an ampoule or a vial is increased, with the result that the vaporization amounts of alkali components contained in the glass are remarkably increased. The vaporized alkali components adhere to an inside wall of the glass tube, and the glass tube is processed into a glass container. Such glass container causes alternation of a drug when the drug is filled and stored therein. In addition, in the case of a glass comprising boron in large amount, the vaporization amount of boron is also increased when the working point is increased, which may cause the delamination.

The glass for a pharmaceutical container of the present invention may be subjected to chemical tempering treatment to form a compressive stress layer in a surface thereof. Specifically, when the glass for a pharmaceutical container of the present invention is subjected to chemical tempering (ion exchange) treatment by being immersed in a KNO$_3$ molten salt at 475° C. for 7 hours, the resultant compressive stress layer has a compressive stress value of preferably 100 MPa or more, or 200 MPa or more, particularly preferably 300 MPa or more. In addition, the depth of the compressive stress layer is preferably 10 μm or more, or 20 μm or more, particularly preferably 30 μm or more.

The compressive stress value (CS) and the depth of layer (DOL) from a sampler surface after chemical tempering (ion exchange) may be measured as described below. First, a sample is mirror polished on both surfaces thereof, and is then subjected to chemical tempering (ion exchange) treatment by being immersed in a KNO$_3$ molten salt at 475° C. for 7 hours. Subsequently, the surface of the sample is washed, and the compressive stress value (CS) of the compressive stress layer in the surface and the depth of layer (DOL) from the sample surface are calculated based on the number of interference fringes observed with a surface stress meter (FSM-6000 manufactured by Orihara Industrial Co., Ltd.) and intervals therebetween. In the calculation, the refractive index and the optical elastic constant of the sample are set to 1.50 and 29.5 [(nm/cm)/MPa], respectively. Although the glass composition in a surface layer of the glass microscopically varies before and after the chemical tempering treatment, the glass composition does not substantially vary as a whole of the glass.

Next, a method of manufacturing a glass tube for a pharmaceutical container of the present invention is described. The following description is given of an example using a Danner method.

First, glass raw materials are blended so as to give a predetermined glass composition, to thereby produce a glass batch. Next, the glass batch is continuously loaded into a melting kiln at from 1,550° C. to 1,700° C. to be melted and fined, and then, while the resultant molten glass is wound around a rotating refractory, the glass is drawn into a tube shape from a tip of the refractory with air blown from the tip.

Subsequently, the glass having been drawn into a tube shape is cut into a predetermined length. Thus, a glass tube is obtained. The glass tube thus obtained is used in manufacturing of a vial or an ampoule.

Without limitation to the Danner method, the glass tube for a pharmaceutical container of the present invention may be manufactured by any method that has hitherto been well known. For example, a Vello method and a down-draw method are each useful as the method of manufacturing the glass tube for a pharmaceutical container of the present invention.

Next, a method of manufacturing a pharmaceutical container of the present invention is described. As an example thereof, the following description is given of an example in which the pharmaceutical container is manufactured by processing a glass tube by a vertical processing method.

First, a glass tube is prepared. Next, the glass tube in an upright state is heated at an end portion thereof on one side with a burner to form a shoulder portion and a finish portion with a forming tool. Next, a portion of the glass tube above the shoulder portion is heated with the burner to be melt-cut.

Subsequently, the portion having been melt-cut is heated with the burner to be formed, to thereby form a bottom portion. Thus, a pharmaceutical container is obtained.

A portion having been melt-cut on a glass tube side is heated with the burner to be opened, and used in manufacturing of the next container. When the above-mentioned forming processing is repeated as described above, a plurality of pharmaceutical containers can be obtained from the glass tube.

Further, when the pharmaceutical container, such as an ampoule or a vial, obtained by using the glass tube for a pharmaceutical container of the present invention is ion exchanged by being immersed in a KNO₃ molten salt, a chemically-tempered pharmaceutical container can be obtained.

In addition, an outer surface of the glass tube for a pharmaceutical container of the present invention may be coated. Any material selected from inorganic coating materials and organic coating materials, such as fluorine, silicon, and a surfactant, may be used as the coating.

Further, an inner surface and/or an outer surface of the pharmaceutical container, such as an ampoule or a vial, obtained by using the glass tube for a pharmaceutical container of the present invention may be coated. Any material selected from inorganic coating materials and organic coating materials, such as fluorine, silicon, and a surfactant, may be used as the coating.

EXAMPLES

The present invention is described below by way of Examples.

Examples (Nos. 1 to 15 and 17 to 63) of the present invention and Comparative Example (No. 16) are shown in Tables 1 to 5.

TABLE 1

| mol % | No. 1 | No. 2 | No. 3 | No. 4 | No. 5 | No. 6 | No. 7 | No. 8 | No. 9 | No. 10 | No. 11 | No. 12 | No. 13 | No. 14 | No. 15 | No. 16 |
|---|---|---|---|---|---|---|---|---|---|---|---|---|---|---|---|---|
| $SiO_2$ | 79.3 | 78.3 | 75.6 | 84.3 | 81.0 | 81.2 | 79.3 | 76.3 | 75.2 | 74.3 | 80.3 | 79.3 | 78.3 | 78.3 | 79.3 | 75.1 |
| $Al_2O_3$ | 6.0 | 6.0 | 6.0 | 6.0 | 5.0 | 6.0 | 6.0 | 6.0 | 6.0 | 11.0 | 6.0 | 6.0 | 6.0 | 6.0 | 6.0 | 6.3 |
| $B_2O_3$ | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.0 |
| $Li_2O$ | 6.0 | 6.0 | 6.0 | 1.0 | 3.0 | 6.0 | 0.0 | 3.0 | 9.0 | 6.0 | 3.5 | 3.0 | 6.0 | 6.0 | 0.0 | 0.0 |
| $Na_2O$ | 6.0 | 6.0 | 6.0 | 6.0 | 6.3 | 6.0 | 12.0 | 3.0 | 0.0 | 6.0 | 5.0 | 6.0 | 6.0 | 6.0 | 7.9 | 12.5 |
| $K_2O$ | 1.9 | 1.9 | 1.9 | 1.9 | 2.9 | 0.0 | 1.9 | 1.9 | 0.0 | 1.9 | 1.9 | 4.9 | 1.9 | 1.9 | 6.0 | 0.1 |
| MgO | 0.0 | 0.0 | 1.7 | 0.0 | 0.0 | 0.0 | 0.0 | 4.0 | 4.0 | 0.0 | 0.0 | 0.0 | 0.0 | 0.0 | 0.0 | 5.1 |
| CaO | 0.0 | 1.0 | 2.0 | 0.0 | 1.0 | 0.0 | 0.0 | 5.0 | 5.0 | 0.0 | 2.5 | 0.0 | 0.0 | 0.0 | 0.0 | 0.7 |
| SrO | 0.0 | 0.0 | 0.0 | 0.0 | 0.0 | 0.0 | 0.0 | 0.0 | 0.0 | 0.0 | 0.0 | 0.0 | 1.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 | 0.0 | 0.0 | 1.0 | 0.0 | 0.0 |
| $ZrO_2$ | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.0 |
| $SnO_2$ | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| $R_2O$ ($Li_2O$ + $Na_2O$ + $K_2O$) | 13.9 | 13.9 | 13.9 | 8.9 | 12.2 | 12.0 | 13.9 | 7.9 | 9.0 | 13.9 | 10.4 | 13.9 | 13.9 | 13.9 | 13.9 | 12.7 |
| $R_2O$ (MgO + CaO+ SrO + BaO) | 0.0 | 1.0 | 3.7 | 0.0 | 1.0 | 0.0 | 0.0 | 9.0 | 9.0 | 0.0 | 2.5 | 0.0 | 1.0 | 1.0 | 0.0 | 5.8 |
| $K_2O/R_2O$ | 0.14 | 0.14 | 0.14 | 0.21 | 0.24 | 0.00 | 0.14 | 0.24 | 0.00 | 0.14 | 0.18 | 0.35 | 0.14 | 0.14 | 0.43 | 0.01 |
| $Al2O_3/R_2O$ | 0.43 | 0.43 | 0.43 | 0.67 | 0.41 | 0.50 | 0.43 | 0.76 | 0.67 | 0.79 | 0.58 | 0.43 | 0.43 | 0.43 | 0.43 | 0.50 |
| $Li2O/$ ($Na_2O$ + K2O) | 0.76 | 0.76 | 0.76 | 0.13 | 0.33 | 1.00 | 0.00 | 0.61 | - | 0.76 | 0.51 | 0.28 | 0.76 | 0.76 | 0.00 | 0.00 |
| MgO/CaO | — | 0.00 | 0.85 | — | 0.00 | — | — | 0.80 | 0.80 | — | 0.00 | — | — | — | — | 7.71 |
| $CaO/Li_2O$ | 0.00 | 0.17 | 0.33 | 0.00 | 0.33 | 0.00 | — | 1.67 | 0.56 | 0.00 | 0.71 | 0.00 | 0.00 | 0.00 | | |
| Hydrolytic resistance [μg/g] | 39 | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | 78 |
| Ps [° C.] | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | 562 |
| Ta [° C.] | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | 615 |
| Ts [° C.] | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | 876 |
| Working point ($10^{4.0}$ dPa · S) [° C.] | 1,219 | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | 1,297 |
| $10^{3.0}$ dPa · s [° C.] | 1,464 | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | 1,398 |

TABLE 2

| mol % | No. 17 | No. 18 | No. 19 | No. 20 | No. 21 | No. 22 | No. 23 | No. 24 | No. 25 | No. 26 | No. 27 | No. 28 | No. 29 |
|---|---|---|---|---|---|---|---|---|---|---|---|---|---|
| $SiO_2$ | 73.19 | 74.61 | 75.11 | 75.61 | 74.81 | 71.15 | 76.75 | 71.19 | 75.81 | 76.31 | 77.81 | 75.74 | 76.24 |
| $Al_2O_3$ | 10.56 | 9.50 | 9.00 | 8.50 | 10.52 | 12.55 | 8.57 | 10.50 | 9.50 | 9.00 | 7.50 | 9.06 | 8.55 |
| $B_2O_3$ | 0.09 | 0.09 | 0.09 | 0.09 | 0.09 | 0.09 | 0.09 | 0.09 | 0.09 | 0.09 | 0.09 | 0.09 | 0.09 |
| $Li_2O$ | 6.11 | 6.09 | 6.09 | 6.09 | 6.12 | 6.11 | 6.13 | 6.12 | 6.09 | 6.09 | 6.09 | 6.12 | 6.13 |
| $Na_2O$ | 5.79 | 5.91 | 5.91 | 5.91 | 5.81 | 5.81 | 5.83 | 5.78 | 5.91 | 5.91 | 5.91 | 5.81 | 5.81 |
| $K_2O$ | 1.86 | 1.90 | 1.90 | 1.90 | 1.92 | 1.91 | 1.90 | 1.90 | 1.90 | 1.90 | 1.90 | 2.47 | 2.47 |
| MgO | 0.00 | 0.00 | 0.00 | 0.00 | 0.00 | 0.00 | 0.00 | 0.00 | 0.00 | 0.00 | 0.00 | 0.00 | 0.00 |
| CaO | 1.65 | 1.20 | 1.20 | 1.20 | 0.00 | 1.63 | 0.00 | 3.67 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 | 0.00 | 0.00 | 0.00 |
| $ZrO_2$ | 0.54 | 0.50 | 0.50 | 0.50 | 0.54 | 0.54 | 0.53 | 0.55 | 0.50 | 0.50 | 0.50 | 0.51 | 0.51 |
| $SnO_2$ | 0.20 | 0.20 | 0.20 | 0.20 | 0.19 | 0.20 | 0.20 | 0.20 | 0.20 | 0.20 | 0.20 | 0.19 | 0.19 |
| $R_2O$ (Li + $Na_2O$ + $K_2O$) | 13.76 | 13.90 | 13.90 | 13.90 | 13.85 | 13.83 | 13.86 | 13.80 | 13.90 | 13.90 | 13.90 | 14.40 | 14.41 |
| R'O (MgO + CaO + SrO + BaO) | 1.65 | 1.20 | 1.20 | 1.20 | 0.00 | 1.63 | 0.00 | 3.67 | 0.00 | 0.00 | 0.00 | 0.00 | 0.00 |
| $K_2O/R_2O$ | 0.14 | 0.14 | 0.14 | 0.14 | 0.14 | 0.14 | 0.14 | 0.14 | 0.14 | 0.14 | 0.14 | 0.17 | 0.17 |
| $Al_2O_3/R_2O$ | 0.77 | 0.68 | 0.65 | 0.61 | 0.76 | 0.91 | 0.62 | 0.76 | 0.68 | 0.65 | 0.54 | 0.63 | 0.59 |
| $Li_2O/(Na_2O + K_2O)$ | 0.80 | 0.78 | 0.78 | 0.78 | 0.79 | 0.79 | 0.79 | 0.80 | 0.78 | 0.78 | 0.78 | 0.74 | 0.74 |
| MgO/CaO | 0.00 | 0.00 | 0.00 | 0.00 | — | 0.00 | — | 0.00 | — | — | — | — | — |
| $CaO/Li_2O$ | 0.27 | 0.20 | 0.20 | 0.20 | 0.00 | 0.27 | 0.00 | 0.60 | 0.00 | 0.00 | 0.00 | 0.00 | 0.00 |
| Hydrolytic resistance test [μg/g] | 45.6 | Unmeasured | Unmeasured | Unmeasured | 40.3 | 46.8 | 36.9 | 47.4 | Unmeasured | Unmeasured | Unmeasured | Unmeasured | 35.3 |
| Alkali resistance test (ISO 695) [mg/dm²] | Unmeasured | Unmeasured | Unmeasured | Unmeasured | Unmeasured | Unmeasured | 55 | 51 | Unmeasured | Unmeasured | Unmeasured | Unmeasured | 55 |
| Acid resistance test (YBB00342004) [mg/dm²] | Unmeasured | Unmeasured | Unmeasured | Unmeasured | Unmeasured | Unmeasured | 0.3 | Unmeasured | 0.4 | Unmeasured | 0.4 | Unmeasured | 0.4 |
| Ps [° C.] | 525 | Unmeasured | Unmeasured | Unmeasured | 534 | 563 | 498 | 522 | Unmeasured | Unmeasured | Unmeasured | 496 | 490 |
| Ta [° C.] | 573 | Unmeasured | Unmeasured | Unmeasured | 586 | 615 | 546 | 567 | Unmeasured | Unmeasured | Unmeasured | 545 | 538 |
| Ts [° C.] | 832 | Unmeasured | Unmeasured | Unmeasured | 865 | 887 | 809 | 805 | Unmeasured | Unmeasured | Unmeasured | 806 | 795 |
| Working point (104.0 dPa · S) [° C.] | 1,284 | 1,264 | 1,256 | 1,248 | Unmeasured | Unmeasured | 1,274 | 1,227 | 1,291 | 1,284 | 1,260 | 1,272 | 1,259 |
| 103.0 dPa · s [° C.] | 1,515 | Unmeasured | Unmeasured | Unmeasured | 1,580 | 1,549 | 1,522 | 1,448 | Unmeasured | Unmeasured | Unmeasured | 1,521 | 1,508 |
| Linear thermal expansion coefficient (20° C. to 300° C.) | Unmeasured | Unmeasured | Unmeasured | Unmeasured | 69 | 70 | 68 | 72 | Unmeasured | Unmeasured | Unmeasured | 71 | 71 |
| Liquidus temperature [° C.] | Unmeasured | Unmeasured | Unmeasured | Unmeasured | 1,018 | 1,089 | 936 | 951 | Unmeasured | Unmeasured | Unmeasured | 872 | 855 |
| Liquidus viscosity (dPa · s) | Unmeasured | Unmeasured | Unmeasured | Unmeasured | 6.0 | 5.6 | 6.2 | 5.9 | Unmeasured | Unmeasured | Unmeasured | 6.8 | 6.9 |
| CS (MPa) | Unmeasured | Unmeasured | Unmeasured | Unmeasured | Unmeasured | Unmeasured | Unmeasured | Unmeasured | Unmeasured | Unmeasured | Unmeasured | Unmeasured | 402 |
| DOL (μm) | Unmeasured | Unmeasured | Unmeasured | Unmeasured | Unmeasured | Unmeasured | Unmeasured | Unmeasured | Unmeasured | Unmeasured | Unmeasured | Unmeasured | 56 |

TABLE 3

| mol % | No. 30 | No. 31 | No. 32 | No. 33 | No. 34 | No. 35 | No. 36 | No. 37 | No. 38 | No. 39 | No. 40 | No. 41 | No. 42 |
|---|---|---|---|---|---|---|---|---|---|---|---|---|---|
| $SiO_2$ | 74.80 | 75.32 | 75.73 | 75.26 | 74.80 | 76.01 | 76.01 | 76.61 | 76.61 | 75.86 | 75.01 | 75.81 | 77.61 |
| $Al_2O_3$ | 9.05 | 8.53 | 8.54 | 8.52 | 8.55 | 8.50 | 8.50 | 7.50 | 7.50 | 8.69 | 9.50 | 9.00 | 7.50 |
| $B_2O_3$ | 0.09 | 0.09 | 0.09 | 0.09 | 0.09 | 0.09 | 0.09 | 0.09 | 0.09 | 0.09 | 0.89 | 0.59 | 0.29 |
| $Li_2O$ | 6.11 | 6.12 | 6.13 | 6.13 | 6.12 | 5.09 | 6.09 | 3.09 | 6.09 | 6.12 | 6.09 | 6.09 | 6.09 |
| $Na_2O$ | 5.79 | 5.80 | 5.80 | 5.79 | 5.77 | 5.91 | 4.91 | 5.91 | 2.91 | 5.81 | 5.91 | 5.91 | 5.91 |
| $K_2O$ | 3.44 | 3.44 | 2.49 | 2.49 | 2.50 | 2.50 | 2.50 | 2.50 | 2.50 | 2.71 | 1.90 | 1.90 | 1.90 |
| MgO | 0.00 | 0.00 | 0.00 | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 1.20 | 1.20 | 3.60 | 3.60 | 0.00 | 0.00 | 0.00 | 0.00 |

TABLE 3-continued

| mol % | No. 30 | No. 31 | No. 32 | No. 33 | No. 34 | No. 35 | No. 36 | No. 37 | No. 38 | No. 39 | No. 40 | No. 41 | No. 42 |
|---|---|---|---|---|---|---|---|---|---|---|---|---|---|
| SrO | 0.00 | 0.00 | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 | 0.00 | 0.00 | 0.00 |
| $ZrO_2$ | 0.52 | 0.51 | 1.03 | 1.52 | 1.98 | 0.50 | 0.50 | 0.50 | 0.50 | 0.52 | 0.50 | 0.50 | 0.50 |
| $SnO_2$ | 0.20 | 0.20 | 0.19 | 0.19 | 0.19 | 0.20 | 0.20 | 0.20 | 0.20 | 0.19 | 0.20 | 0.20 | 0.20 |
| $R_2O$ (Li + $Na_2O$ + $K_2O$) | 15.34 | 15.36 | 14.42 | 14.41 | 14.39 | 13.50 | 13.50 | 11.50 | 11.50 | 14.64 | 13.90 | 13.90 | 13.90 |
| R'O (MgO + CaO + SrO + BaO) | 0.00 | 0.00 | 0.00 | 0.00 | 0.00 | 1.20 | 1.20 | 3.60 | 3.60 | 0.00 | 0.00 | 0.00 | 0.00 |
| $K_2O/R_2O$ | 0.22 | 0.22 | 0.17 | 0.17 | 0.17 | 0.19 | 0.19 | 0.22 | 0.22 | 0.19 | 0.14 | 0.14 | 0.14 |
| $Al_2O_3/R_2O$ | 0.59 | 0.56 | 0.59 | 0.59 | 0.59 | 0.63 | 0.63 | 0.65 | 0.65 | 0.59 | 0.68 | 0.65 | 0.54 |
| $Li_2O/(Na_2O + K_2O)$ | 0.66 | 0.66 | 0.74 | 0.74 | 0.74 | 0.61 | 0.82 | 0.37 | 1.13 | 0.72 | 0.78 | 0.78 | 0.78 |
| MgO/CaO | — | — | — | — | — | 0.00 | 0.00 | 0.00 | 0.00 | — | — | — | — |
| $CaO/Li_2O$ | 0.00 | 0.00 | 0.00 | 0.00 | 0.00 | 0.24 | 0.20 | 1.17 | 0.59 | 0.00 | 0.00 | 0.00 | 0.00 |
| Hydrolytic resistance [μg/g] | 37.8 test | 39.1 | 37.8 | 40.0 | 41.9 | Unmeasured | Unmeasured | Unmeasured | Unmeasured | 37.5 | Unmeasured | Unmeasured | Unmeasured |
| Alkali resistance test (ISO 695) [mg/dm2] | Unmeasured | Unmeasured | 42 | 37 | 35 | Unmeasured | Unmeasured | Unmeasured | Unmeasured | 49 | Unmeasured | Unmeasured | Unmeasured |
| Acid resistance test (YBB00342004) [mg/dm2] | Unmeasured | Unmeasured | Unmeasured | 0.7 | Unmeasured | Unmeasured | Unmeasured | Unmeasured | Unmeasured | 0.6 | Unmeasured | Unmeasured | Unmeasured |
| Ps [° C.] | 485 | 481 | 500 | 511 | 522 | Unmeasured | Unmeasured | Unmeasured | Unmeasured | 488 | Unmeasured | Unmeasured | Unmeasured |
| Ta [° C.] | 533 | 533 | 549 | 560 | 572 | Unmeasured | Unmeasured | Unmeasured | Unmeasured | 536 | Unmeasured | Unmeasured | Unmeasured |
| Ts [° C.] | 784 | 777 | 808 | 822 | 836 | Unmeasured | Unmeasured | Unmeasured | Unmeasured | 792 | Unmeasured | Unmeasured | Unmeasured |
| Working point (104.0 dPa · s) [° C.] | 1,243 | 1,230 | 1,267 | 1,269 | 1,276 | 1,273 | 1,264 | Unmeasured | Unmeasured | 1,253 | Unmeasured | Unmeasured | Unmeasured |
| 103.0 dPa · s [° C.] | 1,490 | 1,474 | 1,510 | 1,506 | 1,506 | Unmeasured | Unmeasured | Unmeasured | Unmeasured | 1,502 | Unmeasured | Unmeasured | Unmeasured |
| Linear thermal expansion coefficient (20° C. to 300° C.) | 76 | 75 | 70 | 70 | 70 | Unmeasured | Unmeasured | Unmeasured | Unmeasured | 72 | Unmeasured | Unmeasured | Unmeasured |
| Liquidus temperature [° C.] | Unmeasured | Unmeasured | 821 | 860 | 861 | Unmeasured | Unmeasured | Unmeasured | Unmeasured | Unmeasured | Unmeasured | Unmeasured | Unmeasured |
| Liquidus viscosity (dPa · s) | Unmeasured | Unmeasured | 7.4 | 7.1 | 7.3 | Unmeasured | Unmeasured | Unmeasured | Unmeasured | Unmeasured | Unmeasured | Unmeasured | Unmeasured |
| CS (MPa) | Unmeasured | Unmeasured | Unmeasured | Unmeasured | Unmeasured | Unmeasured | Unmeasured | Unmeasured | Unmeasured | 520 | Unmeasured | Unmeasured | Unmeasured |
| DOL (μm) | Unmeasured | Unmeasured | Unmeasured | Unmeasured | Unmeasured | Unmeasured | Unmeasured | Unmeasured | Unmeasured | 56 | Unmeasured | Unmeasured | Unmeasured |

TABLE 4

| mol % | No. 43 | No. 44 | No. 45 | No. 46 | No. 47 | No. 48 | No. 49 | No. 50 | No. 51 | No. 52 | No. 53 |
|---|---|---|---|---|---|---|---|---|---|---|---|
| $SiO_2$ | 77.5 | 78.2 | 79.0 | 79.7 | 78.5 | 79.1 | 80.0 | 80.8 | 81.3 | 82.1 | 81.7 |
| $Al_2O_3$ | 7.0 | 6.8 | 6.5 | 6.3 | 6.0 | 5.8 | 5.5 | 5.3 | 5.0 | 4.8 | 4.0 |
| $B_2O_3$ | 0.1 | 0.1 | 0.1 | 0.1 | 0.1 | 0.1 | 0.1 | 0.1 | 0.1 | 0.1 | 0.1 |
| $Li_2O$ | 6.1 | 6.1 | 6.1 | 6.1 | 6.1 | 6.1 | 6.1 | 6.1 | 6.1 | 6.1 | 6.1 |
| $Na_2O$ | 5.9 | 5.4 | 4.9 | 4.4 | 5.9 | 5.5 | 4.9 | 4.3 | 4.1 | 3.5 | 4.7 |
| $K_2O$ | 2.7 | 2.7 | 2.7 | 2.7 | 2.7 | 2.7 | 2.7 | 2.7 | 2.7 | 2.7 | 2.7 |
| MgO | 0.0 | 0.0 | 0.0 | 0.0 | 0.0 | 0.0 | 0.0 | 0.0 | 0.0 | 0.0 | 0.0 |
| CaO | 0.0 | 0.0 | 0.0 | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 | 0.0 |
| $ZrO_2$ | 0.5 | 0.5 | 0.5 | 0.5 | 0.5 | 0.5 | 0.5 | 0.5 | 0.5 | 0.5 | 0.5 |
| $SnO_2$ | 0.2 | 0.2 | 0.2 | 0.2 | 0.2 | 0.2 | 0.2 | 0.2 | 0.2 | 0.2 | 0.2 |
| $R_2O$ ($Li_2O$ + $Na_2O$ + $K_2O$) | 14.7 | 14.2 | 13.7 | 13.2 | 14.7 | 14.3 | 13.7 | 13.1 | 12.9 | 12.3 | 13.5 |
| R'O (MgO + CaO + SrO + BaO) | 0.0 | 0.0 | 0.0 | 0.0 | 0.0 | 0.0 | 0.0 | 0.0 | 0.0 | 0.0 | 0.0 |
| $K_2O/R_2O$ | 0.18 | 0.19 | 0.20 | 0.20 | 0.18 | 0.19 | 0.20 | 0.21 | 0.21 | 0.22 | 0.20 |
| $Al_2O_3/R_2O$ | 0.48 | 0.48 | 0.47 | 0.48 | 0.41 | 0.41 | 0.40 | 0.40 | 0.39 | 0.39 | 0.30 |

TABLE 4-continued

| mol % | No. 43 | No. 44 | No. 45 | No. 46 | No. 47 | No. 48 | No. 49 | No. 50 | No. 51 | No. 52 | No. 53 |
|---|---|---|---|---|---|---|---|---|---|---|---|
| $Li_2O/(Na_2O + K_2O)$ | 0.71 | 0.75 | 0.80 | 0.86 | 0.71 | 0.74 | 0.80 | 0.87 | 0.90 | 0.98 | 0.82 |
| $MgO/CaO$ | — | — | — | — | — | — | — | — | — | — | — |
| $CaO/Li_2O$ | 0.27 | 0.20 | 0.20 | 0.20 | 0.00 | 0.27 | 0.00 | 0.60 | 0.00 | 0.00 | 0.00 |
| Hydrolytic resistance test [µg/g] | 37.8 | 36.3 | 34.4 | 32.9 | 42.8 | 42.8 | 39.1 | 34.4 | 36.0 | 32.2 | 58.9 |
| Ps [° C.] | 477 | 478 | 481 | 485 | 469 | 470 | 472 | 478 | 477 | 482 | 464 |
| Ta [° C.] | 525 | 527 | 530 | 534 | 517 | 518 | 521 | 527 | 527 | 533 | 513 |
| Ts [° C.] | 775 | 780 | 787 | 797 | 763 | 767 | 773 | 788 | 788 | 801 | 765 |
| Working point (104.0 dPa · s) [° C.] | 1,223 | 1,230 | 1,246 | 1,257 | 1,206 | 1,210 | 1,228 | 1,240 | 1,239 | 1,257 | 1,202 |
| 103.0 dPa · s [° C.] | 1,466 | 1,475 | 1,494 | 1,507 | 1,446 | 1,452 | 1,469 | 1,488 | 1,488 | 1,507 | 1,440 |
| Linear thermal expansion coefficient (20° C. to 300° C.) | 70.5 | 69.2 | 66.7 | 64.5 | 70.6 | 69.6 | 64.0 | 66.7 | 63.0 | 60.2 | 65.9 |
| Liquidus temperature [° C.] | <732 | <751 | 800 | 846 | <741 | 843 | 887 | 977 | 1,002 | 1,076< | 1,084< |
| Liquidus viscosity (dPa · s) | 8.3< | 8.0< | 7.4 | 7.0 | 7.9< | 6.7 | 6.3 | 5.7 | 5.5 | <5.0 | <4.7 |

TABLE 5

| mol % | No. 54 | No. 55 | No. 56 | No. 57 | No. 58 | No. 59 | No. 60 | No. 61 | No. 62 | No. 63 |
|---|---|---|---|---|---|---|---|---|---|---|
| $SiO_2$ | 83.8 | 77.7 | 77.7 | 77.7 | 76.8 | 79.9 | 79.9 | 79.9 | 79.9 | 79.9 |
| $Al_2O_3$ | 3.5 | 7.2 | 7.2 | 7.2 | 7.2 | 5.0 | 5.0 | 5.0 | 5.0 | 5.0 |
| $B_2O_3$ | 0.1 | 0.1 | 0.1 | 0.1 | 0.1 | 0.1 | 0.1 | 0.1 | 0.1 | 0.1 |
| $Li_2O$ | 6.1 | 6.1 | 4.1 | 2.1 | 3.1 | 3.5 | 4.8 | 3.5 | 4.8 | 6.1 |
| $Na_2O$ | 3.1 | 1.8 | 3.8 | 5.8 | 5.7 | 2.7 | 1.4 | 1.4 | 0.1 | 0.1 |
| $K_2O$ | 2.7 | 2.7 | 2.7 | 2.7 | 2.7 | 4.5 | 4.5 | 5.8 | 5.8 | 4.5 |
| $MgO$ | 0.0 | 0.0 | 0.0 | 0.0 | 0.0 | 0.0 | 0.0 | 0.0 | 0.0 | 0.0 |
| $CaO$ | 0.0 | 3.7 | 3.7 | 3.6 | 3.7 | 3.6 | 3.6 | 3.6 | 3.6 | 3.6 |
| $SrO$ | 0.0 | 0.0 | 0.0 | 0.0 | 0.0 | 0.0 | 0.0 | 0.0 | 0.0 | 0.0 |
| $BaO$ | 0.0 | 0.0 | 0.0 | 0.0 | 0.0 | 0.0 | 0.0 | 0.0 | 0.0 | 0.0 |
| $ZrO_2$ | 0.5 | 0.5 | 0.5 | 0.5 | 0.5 | 0.5 | 0.5 | 0.5 | 0.5 | 0.5 |
| $SnO_2$ | 0.2 | 0.2 | 0.2 | 0.2 | 0.2 | 0.2 | 0.2 | 0.2 | 0.2 | 0.2 |
| $R_2O$ ($Li_2O + Na_2O + K_2O$) | 11.9 | 10.6 | 10.6 | 10.6 | 11.5 | 10.7 | 10.7 | 10.7 | 10.7 | 10.7 |
| $R'O$ ($MgO + CaO + SrO + BaO$) | 0.0 | 3.7 | 3.7 | 3.6 | 3.7 | 3.6 | 3.6 | 3.6 | 3.6 | 3.6 |
| $K_2O/R_2O$ | 0.23 | 0.22 | 0.22 | 0.17 | 0.17 | 0.17 | 0.19 | 0.19 | 0.22 | 0.22 |
| $Al_2O_3/R_2O$ | 0.29 | 0.59 | 0.56 | 0.59 | 0.59 | 0.59 | 0.63 | 0.63 | 0.65 | 0.65 |
| $Li_2O/(Na_2O + K_2O)$ | 1.05 | 0.66 | 0.66 | 0.74 | 0.74 | 0.74 | 0.61 | 0.82 | 0.37 | 1.13 |
| $MgO/CaO$ | 0.00 | 0.00 | 0.00 | 0.00 | 0.00 | 0.00 | 0.00 | 0.00 | 0.00 | |
| $CaO/Li_2O$ | 0.00 | 0.60 | 0.89 | 1.73 | 1.18 | 1.03 | 0.75 | 1.03 | 0.75 | 0.59 |
| Hydrolytic resistance test [µg/g] | 40.6 | 32.6 | 31.3 | 35.3 | 41.2 | 40.9 | 39.7 | 42.8 | 40.3 | 37.8 |
| Ps [° C.] | 478 | 528 | 533 | 546 | 524 | 524 | 523 | 534 | 536 | 528 |
| Ta [° C.] | 529 | 576 | 583 | 597 | 572 | 573 | 571 | 584 | 585 | 577 |
| Ts [° C.] | 796 | 833 | 845 | 863 | 828 | 836 | 834 | 850 | 847 | 837 |
| Working point (104.0 dPa · s) [° C.] | 1,247 | 1,283 | 1,300 | 1,321 | 1,273 | 1,279 | 1,276 | 1,295 | 1,292 | 1,290 |
| 103.0 dPa · s [° C.] | 1,493 | 1,522 | 1,541 | 1,563 | 1,511 | 1,517 | 1,513 | 1,533 | 1,530 | 1,527 |
| Linear thermal expansion coefficient (20° C. to 300° C.) | 58.3 | 58.0 | 62.6 | 66.6 | 68.9 | Unmeasured | Unmeasured | Unmeasured | Unmeasured | Unmeasured |
| Liquidus temperature [° C.] | 1,099< | 982 | 1,025 | 1,046 | 1,020 | 1,008 | 1,006 | 1,010 | 1,025 | 1,008 |
| Liquidus viscosity (dPa · s) | <4.8 | 6.0 | 5.8 | 5.7 | 5.6 | 5.8 | 5.8 | 5.9 | 5.7 | 5.8 |

The samples were each prepared as described below.

First, 550 g of a batch was blended so as to give the composition shown in the table, and melted at 1,550° C. for 2.5 hours in a platinum crucible. In order to improve the homogeneity of the sample, the content was stirred twice in the course of melting. In order to further improve the homogeneity of the sample, the glass was once crushed with water and dried, and melted again at 1,550° C. for 1 hour in the platinum crucible, followed by being stirred once. In order to reduce bubbles in the sample, the content was melted at 1,600° C. for 2 hours. After the melting, an ingot was produced therefrom, and subjected to various evaluations after being processed into a shape required for measurement. The results are shown in Tables 1 to 3.

The hydrolytic resistance test was performed as a hydrolytic resistance test (washing with acetone) in conformity with ISO 720. The detailed test procedures thereof are as described below. The glass sample was pulverized in an alumina mortar with an alumina pestle, and classified into a particle diameter of from 300 μm to 425 μm with a sieve. The resultant powder was washed with acetone and dried in an oven at 140° C. 10 g of the powder sample after the drying was loaded into a quartz flask, 50 mL of purified water was further added thereto, and the flask was covered with a closure. The quartz flask including the sample was placed in an autoclave and subjected to treatment. The treatment conditions were as follows: a temperature was increased at a rate of 1° C./min from 100° C. to 121° C., was then retained at 121° C. for 30 minutes, and was reduced at a rate of 0.5° C./min to 100° C. The solution in the quartz flask was transferred to another beaker, the quartz flask was further washed with 15 mL of purified water three times, and also the washing liquid was added to the beaker. A methyl red indicator was added to the beaker, and the content was titrated with a 0.02 mol/L hydrochloric acid solution. An alkali elution amount was determined by converting the amount of the hydrochloric acid solution on the assumption that 1 mL of the 0.02 mol/L hydrochloric acid solution corresponded to 620 μg of $Na_2O$. The alkali elution amount was used as a measurement value for the hydrolytic resistance.

The alkali resistance of the glass was evaluated by a test in conformity with ISO 695.

The acid resistance of the glass was evaluated by an acid resistance test in conformity with YBB00342004.

In addition, the strain point Ps was determined as a temperature at which the glass had a viscosity of $10^{14.5}$ Pa·s by a fiber elongation method in conformity with ASTM C336.

The annealing point Ta and the softening point Ts were each determined as a temperature at which the glass had a viscosity of $10^{7.6}$ Pa·s by a fiber elongation method in conformity with ASTM C388.

The working point (the temperature at which the glass had a viscosity of $10^{4.0}$ dPa·s) and the temperature at which the glass had a viscosity of $10^{3.0}$ dPa·s were each determined through measurement by a platinum sphere pull up method.

The linear thermal expansion coefficient was measured for the glass sample formed into a rod shape measuring about 5 mm φ by 20 mm within a temperature range of from 20° C. to 300° C. with a dilatometer.

The liquidus temperature was measured by filling the pulverized glass sample in a platinum boat measuring about 120 mm by about 20 mm by about 10 mm, and loading the platinum boat into an electric furnace having a linear temperature gradient for 24 hours. After that, a site at which a crystal precipitated was identified through observation with a microscope, a temperature corresponding to the site at which a crystal precipitated was calculated from a temperature gradient graph of the electric furnace, and the temperature was used as the liquidus temperature.

The liquidus viscosity was calculated as described below. A glass viscosity curve was determined from the strain point, the annealing point, the softening point, the working temperature, and a Fulcher viscosity calculation formula. The viscosity of the glass at the liquidus temperature was calculated based on the viscosity curve, and the viscosity was used as the liquidus viscosity.

The compressive stress value (CS) of the sample after chemical tempering (ion exchange) and the depth of layer (DOL) from the sample surface were determined with a surface stress meter (FSM-6000 manufactured by Orihara Industrial Co., Ltd.).

As apparent from Tables 1 to 5, the glasses of Examples of the present invention each had a working point of 1,321° C. or less, and an alkali elution amount of 58.9 μg/g or less in the hydrolytic resistance test.

INDUSTRIAL APPLICABILITY

The glass for a pharmaceutical container of the present invention is suitable as a glass for manufacturing a pharmaceutical container, such as an ampoule, a vial, a pre-filled syringe, or a cartridge. In addition, the glass for a pharmaceutical container of the present invention is also applicable to a pharmaceutical container for oral drug pharmaceuticals, or a bottle for beverages.

The invention claimed is:

1. A glass for a pharmaceutical container, comprising as a glass composition, in terms of mol %, 0% to 1.52% of $ZrO_2$, 60% to 85% of $SiO_2$, 3% to 20% of $Al_2O_3$, 0% to 5% of $B_2O_3$, 0% to 9% of $Li_2O$, 0% to 12% of $Na_2O$, 0% to 6% of $K_2O$, 3.09% to 26% of $Li_2O+Na_2O+K_2O$, 0% to 1% of SrO, and 0% to 1% of BaO, having a value for a molar ratio $K_2O/(Li_2O+Na_2O+K_2O)$ of 0.03 to 0.24, and having a value for a molar ratio $Al_2O_3/(Li_2O+Na_2O+K_2O)$ of 0.2 to 1, wherein, in terms of molar relationship, CaO>MgO.

2. The glass for a pharmaceutical container according to claim 1, wherein the glass for a pharmaceutical container comprises as the glass composition, in terms of mol %, 3.09% to 7% of $Li_2O$, 0% to 7.9% of $Na_2O$, and 0% to 3% of $K_2O$.

3. The glass for a pharmaceutical container according to claim 1, wherein the glass for a pharmaceutical container has a total of contents of MgO, CaO, SrO, and BaO of from 0 mol % to 5 mol %.

4. The glass for a pharmaceutical container according to claim 1, wherein the glass for a pharmaceutical container comprises as the glass composition, in terms of mol %, 0% to 0.5% of MgO, 0% to 0.5% of CaO, 0% to 0.3% of SrO, and 0% to 0.3% of BaO.

5. The glass for a pharmaceutical container according to claim 1, wherein the glass for a pharmaceutical container has a value for the molar ratio $Al_2O_3/(Li_2O+Na_2O+K_2O)$ of 0.2 to 0.85.

6. The glass for a pharmaceutical container according to claim 1, wherein the glass for a pharmaceutical container has a content of $B_2O_3$ of from 0.01 mol % to 1 mol %.

7. A glass for a pharmaceutical container, comprising as a glass composition, in terms of mol %, 0% to 1.52% of $ZrO_2$, 60% to 85% of $SiO_2$, 5% to 17.5% of $Al_2O_3$, 0% to 4% of $B_2O_3$, 3.09% to 6% of $Li_2O$, 0% to 8.3% of $Na_2O$, 0% to 5% of $K_2O$, 3.09% to 26% of $Li_2O+Na_2O+K_2O$, 0% to 1% of SrO, 0% to 1% of BaO, and 0% to 5% of MgO+

CaO+SrO+BaO, having a value for a molar ratio $K_2O/(Li_2O+Na_2O+K_2O)$ of 0.03 to 0.24, and having a value for a molar ratio $Al_2O_3/(Li_2O+Na_2O+K_2O)$ of 0.2 to 0.67, wherein, in terms of molar relationship, CaO>MgO.

8. A glass for a pharmaceutical container, comprising as a glass composition, in terms of mol %, 0% to 1.52% of $ZrO_2$, 60% to 85% of $SiO_2$, 5% to 17.5% of $Al_2O_3$, 0% to 5% of $B_2O_3$, 3.09% to 7% of $Li_2O$, 0% to 8.3% of $Na_2O$, 0% to 5% of $K_2O$, 3.09% to 26% of $Li_2O+Na_2O+K_2O$, 0% to 1% of SrO, 0% to 1% of BaO, and 0% to 3.7% of MgO+CaO+SrO+BaO, having a value for a molar ratio $K_2O/(Li_2O+Na_2O+K_2O)$ of 0.03 to 0.24, and having a molar ratio $Al_2O_3/(Li_2O+Na_2O+K_2O)$ of 0.2 to 0.67, wherein, in terms of molar relationship, CaO>MgO.

9. A glass for a pharmaceutical container, comprising as a glass composition, in terms of mol %, 0% to 1.52% of $ZrO_2$, 60% to 85% of $SiO_2$, 5% to 20% of $Al_2O_3$, 0% to 5% of $B_2O_3$, 3.09% or more of $Li_2O$, 3.09% to 26% of $Li_2O+Na_2O+K_2O$, and 0% to 3% of MgO+CaO+SrO+BaO, having a value for a molar ratio $K_2O/Li_2O+Na_2O+K_2O$ of 0.03 to 0.24, and having a value for a molar ratio $Al_2O_3/(Li_2O+Na_2O+K_2O)$ of 0.2 to 1, wherein, in terms of molar relationship, CaO>MgO.

10. A glass for a pharmaceutical container, comprising as a glass composition, in terms of mol %, 0% to 1.52% of $ZrO_2$, 60% to 85% of $SiO_2$, 3% to 7% of $Al_2O_3$, 0% to 5% of $B_2O_3$, 3.09% to 7% of $Li_2O$, 0% to 8.3% of $Na_2O$, 0% to 5% of $K_2O$, 3.09% to 26% of $Li_2O+Na_2O+K_2O$, 0% to 1% of SrO, 0% to 1% of BaO, and 0% to 3.7% of MgO+CaO+

SrO+BaO, having a value for a molar ratio $K_2O/(Li_2O+Na_2O+K_2O)$ of 0.03 to 0.24, having a value for a molar ratio $Al_2O_3/(Li_2O+Na_2O+K_2O)$ of 0.02 to 0.5, and having a value for a molar ratio $SiO_2/Al_2O_3$ of 16 or less, wherein, in terms of molar relationship, CaO>MgO.

11. The glass for a pharmaceutical container according to claim 1, wherein the glass for a pharmaceutical container is classified as at least HGA 1 in a hydrolytic resistance test (washing with acetone) in conformity with ISO 720.

12. The glass for a pharmaceutical container according to claim 1, wherein the glass for a pharmaceutical container has a working point of 1,300° C. or less.

13. A glass tube for a pharmaceutical container, comprising the glass for a pharmaceutical container of claim 1.

14. A pharmaceutical container, comprising the glass for a pharmaceutical container of claim 1.

15. The glass for a pharmaceutical container according to claim 1, wherein the glass for a pharmaceutical container comprises as the glass composition, in terms of mol %, 0% to 1.03% of $Zr_2O$.

16. The glass for a pharmaceutical container according to claim 1, wherein the glass for a pharmaceutical container has a total content of MgO, CaO, SrO and BaO of 0 mol % to 1 mol %.

17. The glass for a pharmaceutical container according to claim 1, wherein the glass for a pharmaceutical container has a value for a molar ratio $Al_2O_3/(Li_2O+Na_2O+K_2O)$ of 0.2 to 0.74.

* * * * *